(No Model.)  5 Sheets—Sheet 1.

W. W. HASTINGS.
GEAR CUTTER.

No. 434,019. Patented Aug. 12, 1890.

WITNESSES:
John Edwards Jr.
E. V. Tracy

INVENTOR.
Walter W. Hastings,
By James Shepard
Atty.

(No Model.)  
5 Sheets—Sheet 3.

W. W. HASTINGS.
GEAR CUTTER.

No. 434,019. Patented Aug. 12, 1890.

WITNESSES  
John Edwards Jr.  
E. V. Tracy.

INVENTOR.  
Walter W. Hastings,  
By James Shepard. Atty (No Model.) 5 Sheets—Sheet 4.
W. W. HASTINGS.
GEAR CUTTER.

No. 434,019. Patented Aug. 12, 1890.

WITNESSES
John Edwards Jr.
E. V. Tracy.

INVENTOR.
Walter W. Hastings.
By James Shepard
Atty.

(No Model.)
5 Sheets—Sheet 5.
W. W. HASTINGS.
GEAR CUTTER.
No. 434,019. Patented Aug. 12, 1890.
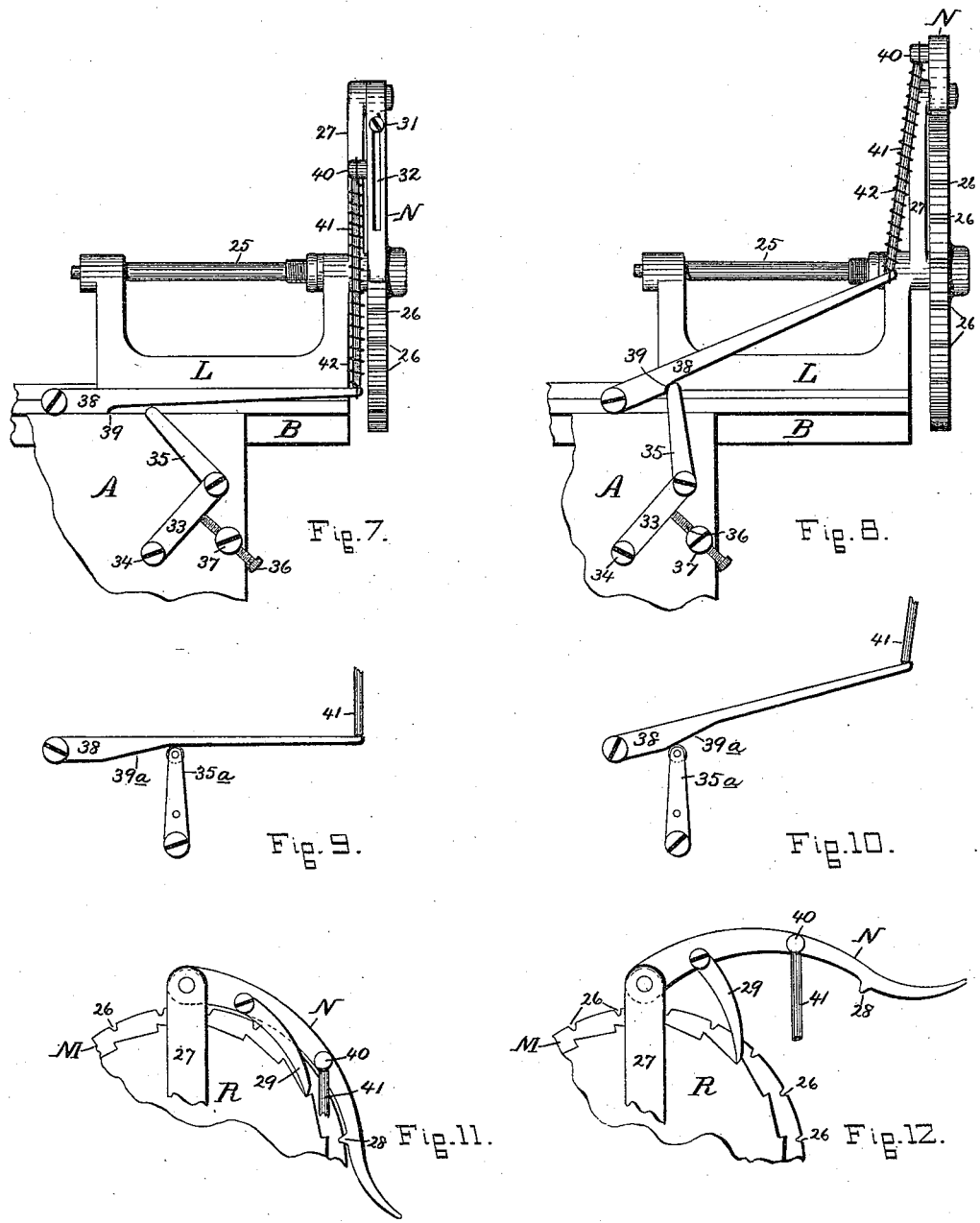
WITNESSES:
John Edwards Jr.
E. V. Tracy.
INVENTOR.
Walter W. Hastings.
By James Shepard.
Atty

UNITED STATES PATENT OFFICE.

WALTER W. HASTINGS, OF JERSEY CITY, NEW JERSEY.

GEAR-CUTTER.

SPECIFICATION forming part of Letters Patent No. 434,019, dated August 12, 1890.

Application filed October 3, 1889. Serial No. 325,919. (No model.)

*To all whom it may concern:*

Be it known that I, WALTER W. HASTINGS, a citizen of the United States, residing at Jersey City, in the county of Hudson and State of New Jersey, have invented certain new and useful Improvements in Gear-Cutters, of which the following is a specification.

My invention relates to improvements in gear-cutters; and the objects of my invention are to render the action of the machine automatic and in general to improve the construction and efficiency of the machine.

Figure 1:
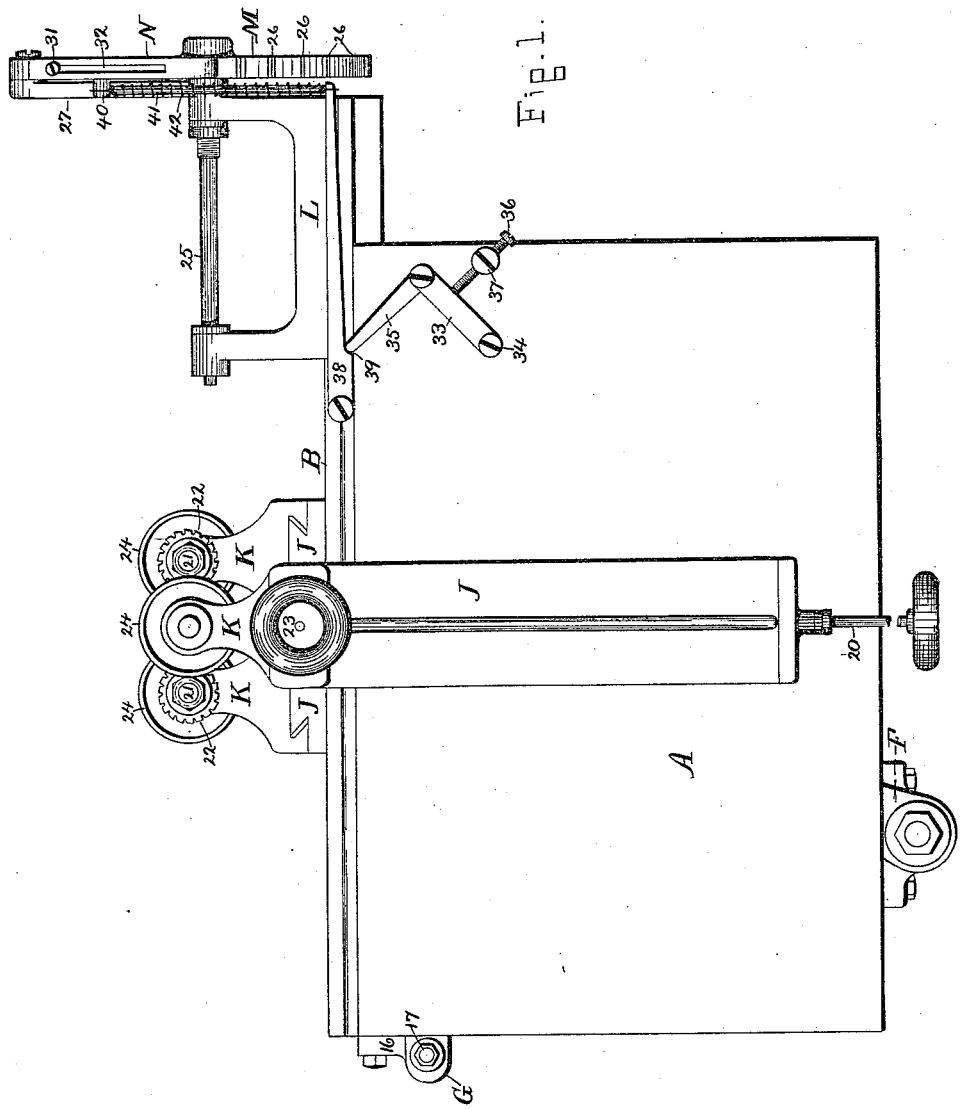
Figure 2:
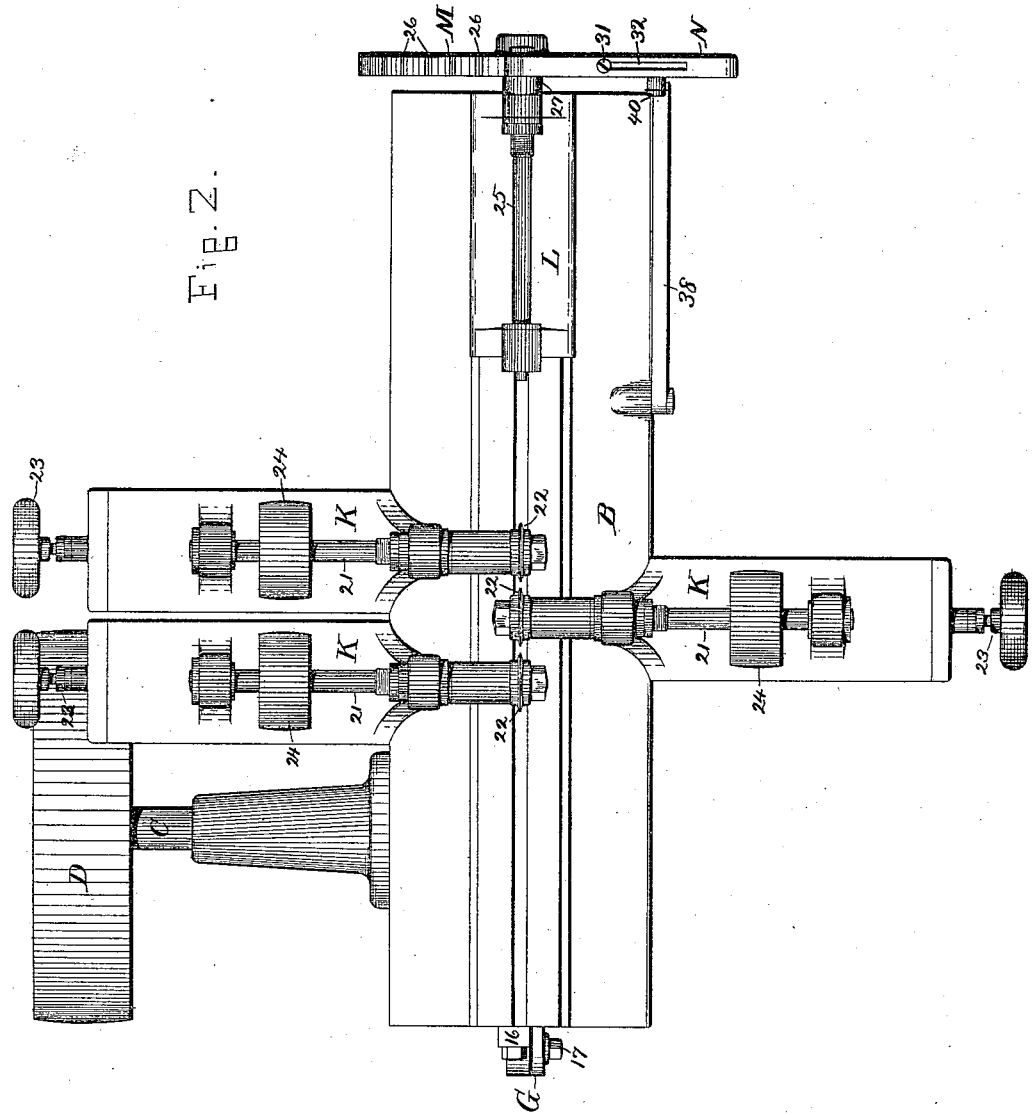
Figure 3:
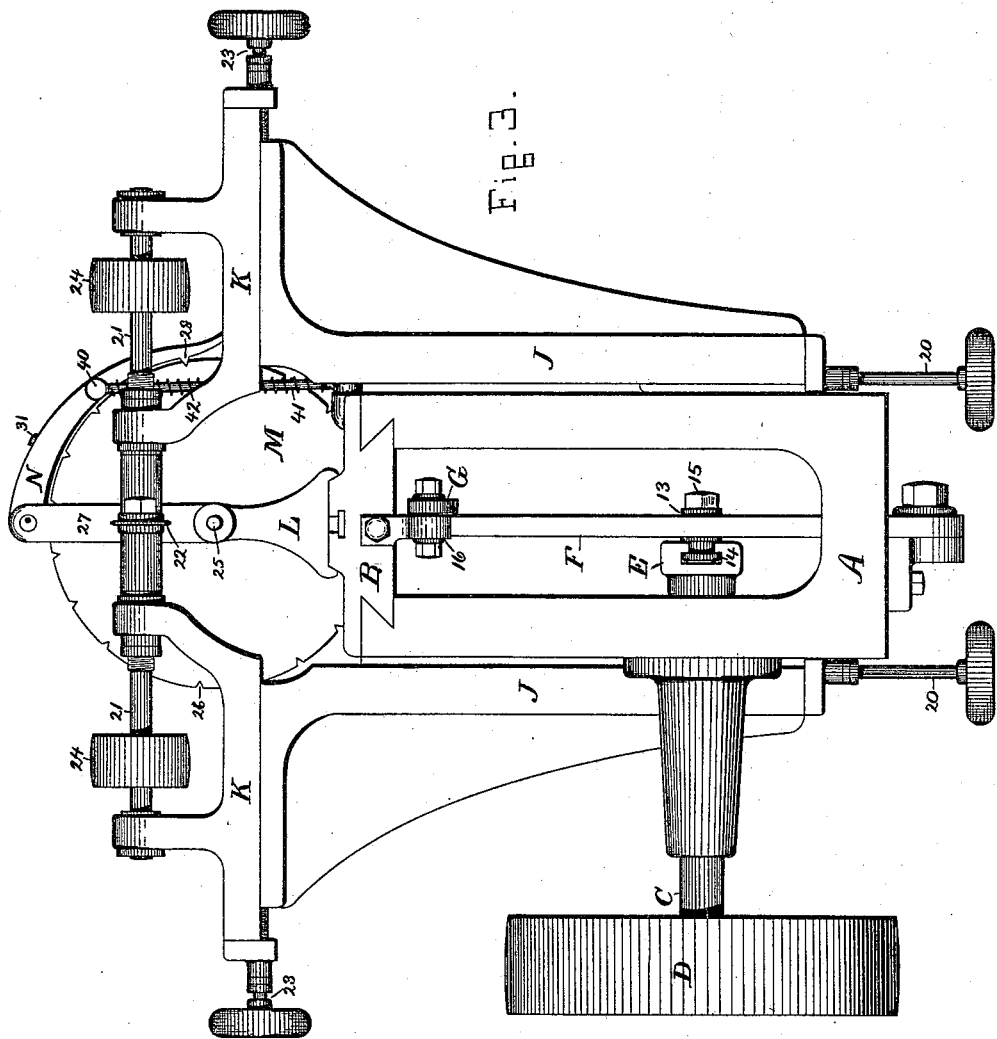
Figure 4:
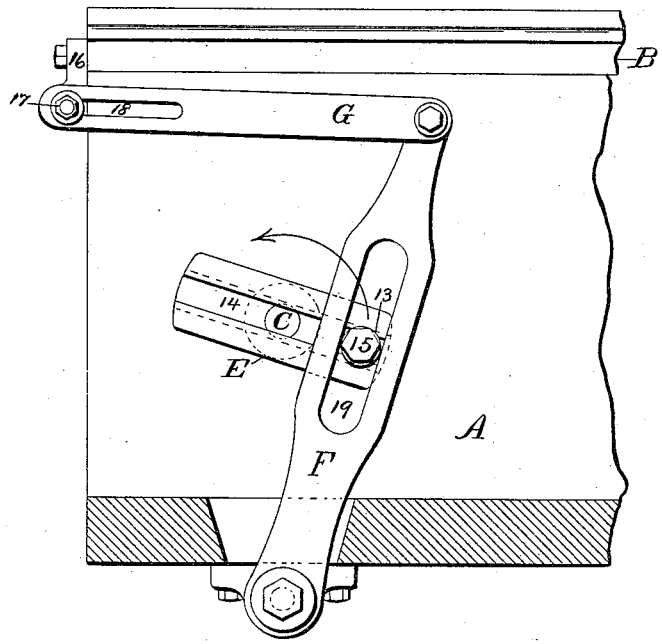
Figure 5:
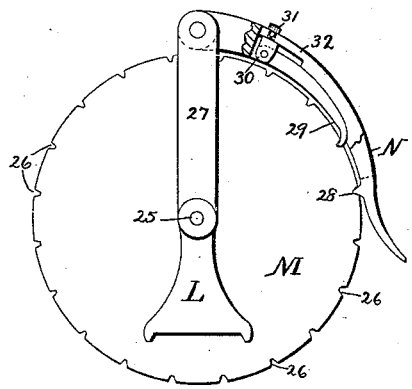
Figure 6:
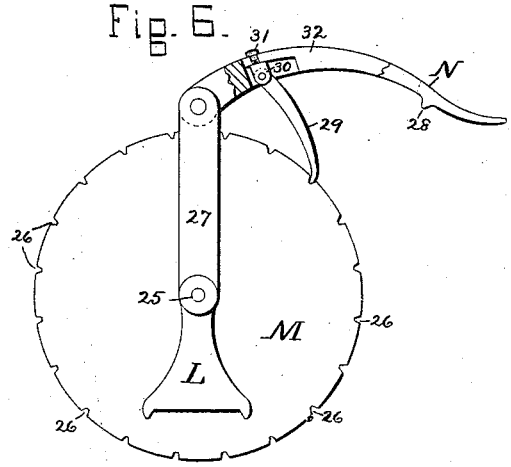
Figure 6A:
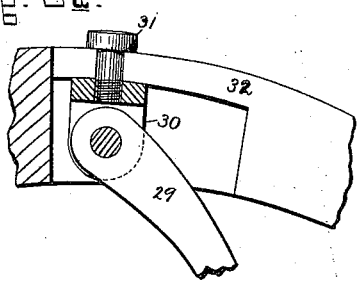

In the accompanying drawings, Figure 1 is a front elevation of my machine. Fig. 2 is a plan view. Fig. 3 is a side elevation showing the frame in end view. Fig. 4 is a detached view showing a portion of the frame in vertical section, with a portion of the carriage and its driving mechanism in front elevation. Fig. 5 is a detached side elevation of the division-plate and part of its operating mechanism, the lift-lever being partly in section. Fig. 6 is a like view of the same parts in a different position. Fig. 6ª is an enlarged view showing the adjustment of the pawl upon the lift-lever. Fig. 7 is a detached front elevation showing the division-plate and its operating mechanism. Fig. 8 is a like view of the same with the parts in a different position. Figs. 9 and 10 are front elevations showing a modification in a part of the operating mechanism, and Figs. 11 and 12 are detached side elevations showing another modification.

The particular form of machine illustrated is specially designed for cutting gears for clocks and watches; but I do not wish to restrict my invention to cutting any particular kind of gears.

A designates the frame of the machine, on the upper part of which in suitable ways is the reciprocating carriage B. At the lower part of the frame on the rear side is the driving-shaft C, having driving-pulley D, and at a point upon the inside of the frame said shaft is provided with a head or plate E, carrying the adjustable crank-pin 13. This head or plate E is provided with a T-shaped slot 14, within which the head of the crank-pin 13 is held, and along which slot it may be adjusted by loosening the nut 15 in the well-known manner of adjusting like pins or studs in like slots. To the lower part of the frame a lever F is fulcrumed, the upper end of said lever being connected with a pitman G, while the other end of said pitman is connected with a stud or bracket 16 on the end of the carriage B. This pitman is connected to said bracket by means of a bolt 17, the body of which passes through the slot 18 in said pitman, whereby the carriage may be adjustably secured to the upper end of the lever F. The lever F is provided with a slot 19, into which the crank-pin 13 fits, whereby the revolution of the shaft C will act to reciprocate the lever G and the carriage B. The crank-pin 13 and shaft C revolve in the direction indicated by the dart in Fig. 4. Consequently the carriage B is moved forward to the left when the crank-pin is at the greatest distance from the fulcrum of the lever F and is moved on the return-stroke to the right when the crank-pin is nearest the fulcrum of said lever, whereby the forward movement of the carriage to the left is slower than its return movement to the right.

On one side of the machine I arrange upon suitable ways a vertically-sliding block J and two corresponding blocks J upon the rear side. These are adjusted up and down by means of the feed-screws 20 in the usual manner of adjusting other sliding blocks with feed-screws, and therefore it is considered unnecessary to describe the construction in detail. At the head of each of the vertically-sliding blocks J there are transverse sliding blocks or frames K, each bearing a spindle 21 for carrying a saw or cutter 22 of any ordinary construction. These transverse sliding blocks are each provided with screws 23 for adjusting them laterally. The several spindles 21 are each provided with a driving-pulley 24 for the reception of belts for driving said spindles in the ordinary manner.

Upon one end of the carriage B, I mount the spindle-frame L, which frame carries the shaft or spindle 25. The front end of this spindle is adapted to receive and carry a chuck or arbor (not shown) for bearing the wheels to be cut, which chuck or arbor may be attached to said spindle in any ordinary manner of attaching analogous tools. For instance, that end of the spindle 25 which faces the cutters 24 may be provided with a tapering socket, like that in the spindle of an ordinary engine-lathe, and the end or shank of the arbor may be made tapering to fit said socket as the center of an engine-lathe fits the socket in the lathe-spindle, or the socket may be screw-threaded and the chuck or arbor screwed into the same. Said arbor will also be provided with a flange or collar at one point and a nut at its outer end, so that a wheel or wheels placed on said arbor may be clamped and held on said arbor by screwing up said nut in the ordinary manner of holding wheels, collars, or disks on an arbor. In all cases the wheel or wheels will be held so as to be concentric with the spindle 25 and to revolve therewith when the division-plate is revolved. The cutter or cutters will act on the wheel or wheels in precisely the same way that a like cutter or cutters have heretofore acted in cutting gears. The particular means for holding the wheels, the cutters themselves, and the form of teeth cut by them are no part of my invention further than that the machine must have a cutter or cutters of some kind and means for holding the wheel or wheels to be cut. The opposite end of said spindle is provided with a division-plate M or disk having a graduated series of notches 26 at its edge.

A rigid arm 27 projects upwardly from the spindle-frame L, to the upper end of which arm I pivot the lift-lever N. Said lever has a point or projection 28 upon its under side for engaging the notches 26 in the edge of the division-plate and holding the division-plate and spindle against rotation until the lift-lever is withdrawn therefrom. To the under side of this lift-lever I pivot the pawl or dog 29, which in the preferred form engages the notches in the edge of the division-plate. Said pawl or dog is preferably adjustable upon the lift-lever, which adjustability I accomplish by pivoting said dog to the bracket or block 30, which may be loosened for adjustment and fastened in place by means of the adjusting-screw 31, that passes through a slot 32 in the lift-lever into said bracket or block 30.

Upon the front side of the frame A, I pivot a link 33 by means of the screw 34, and to the opposite end of said link I pivot the swinging arm 35. This link and arm are adjusted in their position by means of the adjusting-screw 36, which passes through a threaded hole in the stud or post 37 on the frame A. To the front side of the carriage, toward the right-hand end, I pivot a lever 39. Upon one side of the lift-lever N, I arrange a stud 40, and between said stud and the end of the lever 38, I place a push-rod or pitman 41. I hold this pitman in place by letting its pointed ends rest in depressions in said stud and lever and connect said stud and lever by a spring 42, that surrounds said pitman or push-rod.

The operator places a blank wheel or bunch of wheels to be cut upon the arbor or holder and attaches the same to the left-hand end of the spindle or shaft 25. By means of the adjusting-screws 20 and 23 the cutters 22 are adjusted vertically and laterally to bring them into the desired position, the same as they would be adjusted for cutting gear in a machine whose carriage was moved by hand. The cutters are represented higher in Fig. 3 than in Fig. 1. Any desired number of cutters from one upward may be employed. The crank-pin 13 and the slotted end of the pitman G are adjusted to give the carriage the desired throw. The spindle-frame L is also longitudinally adjustable on the carriage B. The link 33 and connected arm 35, together with the pawl or dog 29, are adjusted for raising the lift-lever a greater or less extent, according to the number of teeth required to be cut. The adjustments having been made, the machine is set in motion, and the crank-pin, acting upon the lever F, moves the carriage B forward to the right with a slow motion, and back on its return-stroke with a swifter motion. In moving back, the shoulder 39 on the lever 38 engages the upper end of the swinging link 35, as shown in Fig. 1, and on the continued movement of the carriage the link swings backward and upward, carrying the lever 38 with it, as shown in Fig. 8.

Fig. 7 shows the parts just prior to the engagement of the shoulder 39 with the link 35. Raising the lever 38 also raises the lift-lever through the connecting push-rod 41, and carries said lever from the position shown in Fig. 5 to that shown in Fig. 6, or to a point a little higher than that shown, thereby drawing the pawl or dog upward, so as to engage the next succeeding notch in the division-plate when spaced and adjusted as shown. As the carriage makes another stroke to the left the lift-lever and lever 38 are allowed to fall by gravity and move the division-plate forward a given distance ready for cutting the next tooth, and the operation before described is repeated until the division-plate has made a complete revolution and all of the teeth have been cut. If desired, the descent of the shoulder-lever 38 and lift-lever N may be assisted by a spring or springs.

As in other machines different division-plates may be used, and the parts may be adjusted so as to move a division-plate and connected spindle one or more of its divisions at each reciprocation of the carriage.

In Figs. 9 and 10 I have represented the lever 38 as made with a beveled shoulder 39ª, and, instead of a swinging arm for engaging said shoulder, I provide a stationary arm 35ª, which will act to throw the lever from the position shown in Fig. 9 to that shown in Fig. 10. This stationary arm may be used as a substitute for the swinging one in the general combination, although I prefer the construction first described.

In Figs. 11 and 12 I have also shown a slight modification, which consists in placing a ratchet-wheel R upon one side of the division-plate and concentric therewith, and having the pawl or dog 29 engage the teeth of said ratchet-wheel, instead of the division-plate. By making the ratchet-wheel of a smaller size than the division-plate I can, with this arrangement, use a somewhat larger division-plate with a given throw of the lift-lever N.

I claim as my invention—

1. The combination of a spindle and cutter for cutting gear, the shaft or spindle for carrying the wheel or wheels to be cut, a division plate or disk secured to said shaft or spindle, the carriage on which said shaft and division-plate are mounted, the driving-shaft C, connecting mechanism intermediate said shaft and carriage for reciprocating the latter, and mechanism intermediate the carriage and division-plate for moving said plate a given distance at each reciprocation of said carriage, substantially as described, and for the purpose specified.

2. The combination of a spindle and cutter for cutting gear, the shaft or spindle for holding the wheel or wheels to be cut, the carriage on which said shaft or spindle is mounted, the driving-shaft C, the crank-pin 13, rotating with said shaft, the lever F, fulcrumed to the frame of the machine and having the slot 19 for said crank-pin, and the pitman G, connecting said lever and carriage, substantially as described, and for the purpose specified.

3. The combination of the reciprocating carriage B, the shaft or spindle 25 and its frame mounted on said carriage, the division-plate connected to said shaft, the lift-lever N, the pawl or dog 29, pivoted to said lift-lever, and connecting mechanism intermediate said lift-lever and carriage for moving the former at each reciprocation of the latter, substantially as described, and for the purpose specified.

4. The combination of the reciprocating carriage B, the shaft or spindle 25 and its frame mounted on said carriage, the division-plate connected to said shaft, the lift-lever N, the pawl or dog 29, pivoted to said lift-lever, the shouldered lever 38, pivoted to said carriage, a tripping-arm on the frame for contact with said shouldered lever, and connecting devices between said shouldered lever and lift-lever, substantially as described, and for the purpose specified.

5. In a gear-cutter having a lever for moving its division-plate, the combination of the reciprocating carriage, the shouldered lever 38, pivoted on said carriage, the link 33, pivoted to the frame of the machine, the swinging arm 35, pivoted to said link, and the adjusting-screw 36, substantially as described, and for the purpose specified.

6. In a gear-cutter, the combination of the division-plate, the lift-lever N, the bracket 30, the pawl or dog pivoted to said bracket, and means for adjusting said bracket and connected pawl longitudinally on said lift-lever, substantially as described, and for the purpose specified.

7. In a gear-cutter, the combination of the division-plate, the lift-lever N, pivoted on a fixed fulcrum and having the projection 28, and the dog or pawl pivoted to said lift-lever, substantially as described, and for the purpose specified.

8. The combination of the reciprocating carriage B, the shaft or spindle 25 and its frame mounted on said carriage, the division-plate connected to said shaft, the lift-lever N, the pawl or dog 29, pivoted to said lift-lever, the shouldered lever 38, pivoted to said carriage, a tripping-arm on the frame for contact with said shouldered lever, the rod or pitman 41, and spring 42 for connecting said shouldered lever and lift-lever, substantially as described, and for the purpose specified.

9. In a gear-cutter, the combination of the division-plate, a reciprocating carriage, and mechanism intermediate said division-plate and carriage for moving the former at each reciprocation of the latter, substantially as described, and for the purpose specified.

10. The combination of a spindle and cutter for cutting gear, the shaft or spindle for holding the wheel or wheels to be cut, the carriage on which said shaft or spindle is mounted, the driving-shaft C, the slotted head or plate E on the end of said shaft, the crank-pin 13, devices for adjustably securing said pin in said head or plate, the lever F, fulcrumed to the frame of the machine and having the slot 19 for said crank-pin, and the pitman G, connecting said lever and carriage, substantially as described, and for the purpose specified.

11. The combination of a spindle and cutter for cutting gear, the shaft or spindle for holding the wheel or wheels to be cut, the carriage on which said shaft or spindle is mounted, the driving-shaft C, the slotted head or plate E on the end of said shaft, the crank-pin 13, devices for adjustably securing said pin in said head or plate, the lever F, fulcrumed to the frame of the machine and having the slot 19 for said crank-pin, the pitman G, connecting said lever and carriage, and means for adjustably securing said pitman to said carriage, substantially as described, and for the purpose specified.

WALTER W. HASTINGS.

Witnesses:
WM. C. ROBERTS,
GEO. P. WADLEIGH.